United States Patent [19]
Wetzel

[11] 3,968,974
[45] July 13, 1976

[54] BRAKEABLE HAND TRUCK

[76] Inventor: Nelson Wetzel, Rte. 2, Box 100, Hillsboro, Oreg. 97123

[22] Filed: Feb. 21, 1975

[21] Appl. No.: 551,725

[52] U.S. Cl. ............................ 280/47.27; 188/18 A; 188/22; 188/71.1
[51] Int. Cl.² ............................................ B62B 5/04
[58] Field of Search ............... 188/18 A, 71.1, 19, 188/22; 280/47.24, 47.27

[56] References Cited
UNITED STATES PATENTS

| | | | |
|---|---|---|---|
| 3,422,930 | 1/1969 | Barron | 188/22 |
| 3,608,661 | 9/1971 | Arnot | 188/18 A X |
| 3,780,834 | 12/1973 | Lottridge | 188/18 A |

Primary Examiner—George E. A. Halvosa
Attorney, Agent, or Firm—Chernoff & Vilhauer

[57] ABSTRACT

A hand truck having a flat, rigid, annular disc coaxially fixed to each of a pair of outboard wheels between the hand truck frame and the wheel. A respective caliper having two parallel fingers which hold respective brake pads is mounted on the hand truck frame adjacent the periphery of each disc so that the two fingers are disposed on either side of the disc for forcibly pinching the disc between the brake pads. The calipers and associated mounting hardware are specially structured so as to minimize the space between the inside of the wheel and the outside of the frame. To ensure even wear of the brake pads the wheels are mounted on bearings which permit axial sliding of the wheels on their axle so that the discs float between the two caliper brake pads. The calipers are actuated in response to hydraulic pressure produced by a master cylinder which in turn is operated through a bell crank linkage by a lever placed directly below a hand truck handle so that the lever may be pulled upwardly by a squeezing motion. The wheel and disc structure is designed so as to permit the use of a single common axle for both wheels, thereby minimizing the weight and cost of the hand truck brake system.

7 Claims, 2 Drawing Figures

BRAKEABLE HAND TRUCK

BACKGROUND OF THE INVENTION

This invention relates to a brakeable hand truck, particularly one having a hydraulically-operated disc brake system.

In the commercial transportation of goods where many large and heavy packages must be loaded and unloaded manually, the use of a hand truck suitable for handling such heavy loads is very helpful. One requirement of such a hand truck which has become increasingly important for safety reasons is that it have an adequate braking system, that is, a braking system which will enable the operator to restrain a heavily loaded hand truck as it is moved down an inclined ramp and properly guide and balance the load without having to exert too much physical effort. Without adequate and reliable braking, a heavily loaded hand truck can pull the operator forcibly down an incline, causing him to lose balance and injure both himself and the load.

In addition, it is particularly desirable that a brakeable hand truck be of light-weight construction so that it may be lifted and carried maually with little effort, and that it utilize pneumatic tires in order to increase its stability against tipping by reducing the shocks from moving over bumps or objects.

One solution to the braking problem heretofore applied is a bar-type brake comprising a metal bar which rubs against the rubber surface of the hand truck tires when actuated, as shown in Honeyman U.S. Pat. No. 3,276,550. One drawback of the bar-type brake is that when the tires get wet, as frequently is the case, the friction between the bar and the tire surface is greatly reduced and the brake becomes considerably less effective. Also both the bar and the tire, which comprise the friction producing parts, tend to wear rapidly which makes the use of pneumatic tires impractical since they would have to be frequently replaced, and necessitates considerable expense in the frequent replacement of the metal bar. Finally, tires with a significant amount of tread cannot readily be used with a bar-type brake to enhance the tires' grip on the ground because the spaces in the tread would considerably reduce the brake's friction-producing surface area and tend to cause grabbing as the bar catches the edges of the tread.

Another approach to the braking of hand trucks is to use a strap-type brake wherein a strap of flexible material is wrapped around a drum mounted to rotate in unison with a wheel so that the strap may be pulled tightly against the drum to produce braking friction, as shown in Barron U.S. Pat. No. 3,422,930. A principal problem with the strap-type brake is that dust and dirt tend to collect between the strap and the drum which diminishes the friction-producing surface area, thereby reducing the effectiveness of the brake, and frequently causes uncontrolled grabbing of the brake. When a heavy load is being moved down an incline such grabbing can be very dangerous since, upon abrupt stopping of the truck, the momentum of the load may cause it to be thrown off the hand truck and possibly cause the hand truck to pivot forwardly over its axle, thereby violently pulling the operator forward and injuring him.

A further apparatus for braking a hand truck utilizes a shoe-type braking member which moves outwardly against the interior surface of the hand truck wheels, or a brake drum mounted to rotate in unison with the wheels, as shown in Smith U.S. Pat. No. 2,246,147. Like the strap-type brake such a system utilizes a horizontally-oriented friction surface which tends to collect dust and dirt, as well as water, thereby leading to degradation of its braking ability or possible uncontrolled grabbing.

Thus there is at present a need for a brakeable hand truck which provides ample braking force which may be reliably applied in a smooth, modulating fashion with little effort, avoids wear of the tire rubber, is sturdy and long-wearing while not adding appreciable weight to the truck, and is unaffected by moisture and dirt.

SUMMARY OF THE INVENTION

The present invention overcomes the aforementioned drawbacks of prior art brakeable hand trucks by utilizing a specially constructed, hydraulically actuated disc-type braking system in a hand truck. To this end a flat, rigid, vertically-oriented disc is fixedly attached to each wheel of the hand truck to rotate in unison therewith. Typically there are two independent outboard wheels on a hand truck mounted rotatably on a common fixed axle; thus, two respective discs are attached coaxially to each wheel, each disc preferably being annular in shape and disposed between the wheel and the hand truck frame. A caliper fixedly mounted to the frame of the hand truck and having two parallel fingers with brake pads forming a slot therebetween is associated with each disc so that the disc rotates between the brake pads. When the caliper is actuated the pads forcibly pinch the rotating disc to produce braking friction.

The disc and caliper arrangement eliminates the need for friction between a braking member and the tires, thereby eliminating wear on the tires. Also, wear is isolated primarily to the brake pads which may be designed for easy and inexpensive replacement. In addition, since none of the parts of the disc brake contains any lateral friction-producing surfaces, the brake has very little tendency to collect water, dust or dirt which can settle on lateral braking surfaces and lead to degradation of the braking capability or uncontrolled grabbing.

The wheels of the hand truck are mounted to permit lateral movement of each wheel with respect to the axle, which in turn permits the attached disc to float back and forth laterally with respect to the hand truck frame thereby preventing uneven wear of the brake pads. This arrangement, wherein the calipers are fixedly mounted and the wheels float, eliminates the need for floating calipers which would otherwise necessitate undesirable heavy and bulky mounting hardware, adding to the weight of the truck and requiring a wider spread of the wheels which would hinder its usefulness in cramped quarters. In addition, the particular structural arrangement which enables the calipers and discs to be mounted between the inside of the wheel and the outside of the hand truck frame enables the wheels to be mounted on a common axle, thereby eliminating substantial weight and expense from the truck.

Actuation of the calipers is accomplished through a hydraulic system whereby a master cylinder is operated by a hand lever to pressurize a fluid which causes the calipers to pinch the disc. The hand lever is placed adjacent and directly underneath the hand truck grip so that it may be operated by an upward movement produced by squeezing one hand. The hydraulic system provides considerably more mechanical advantage than do strictly mechanical braking systems, thereby more effectively producing the necessary modulated frictional braking forces with less manual force being required on the single hand control. Also, the hydraulic system facilitates the application of equal braking force to each wheel to prevent pulling to the right or the left. Moreover the elimination of extensive mechanical linkages removes unnecessary and undesirable weight and wearable parts from the hand truck.

It is therefore a principal objective of the present invention to produce a new and improved brakeable hand truck providing ample braking force which may be smoothly and reliably applied in a modulating fashion with little effort.

It is another objective of the present invention to provide such a hand truck which does not wear the tire surface of the hand truck wheels.

It is a further objective of the present invention to provide such a braking apparatus which is relatively insensitive to dust and moisture and is sturdy and long-wearing without adding appreciable weight to the truck.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 1:
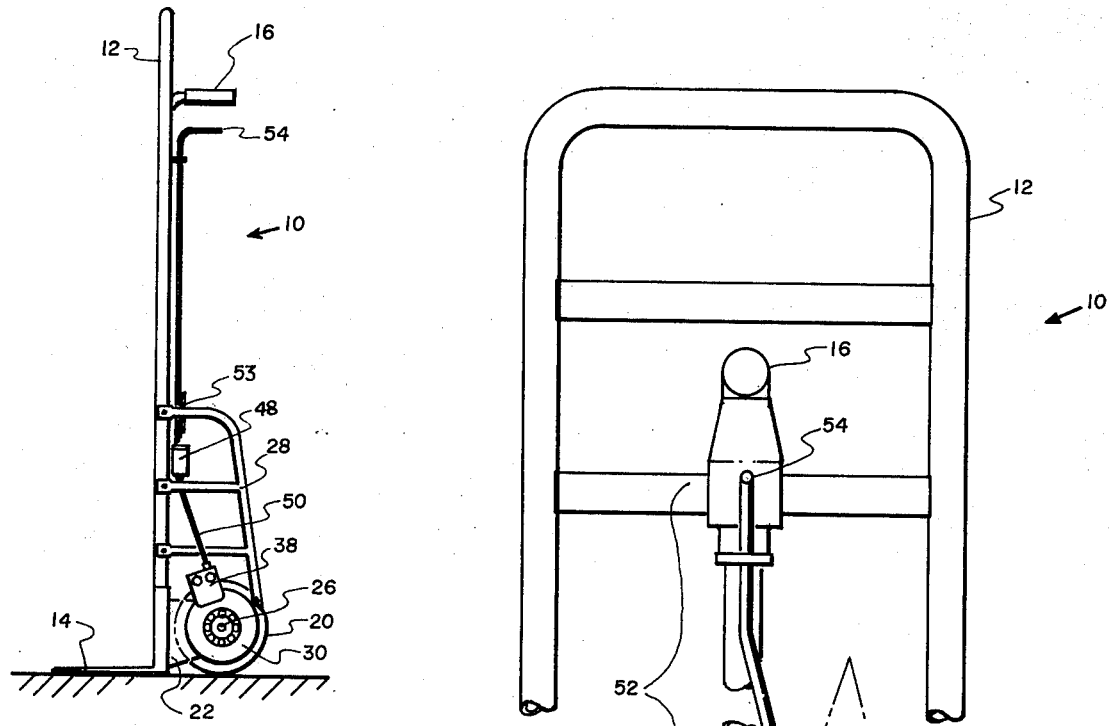
FIG. 1 is a side view of a typical hand truck incorporating the braking system of the present invention, with the left wheel of the hand truck removed.
Figure 2:
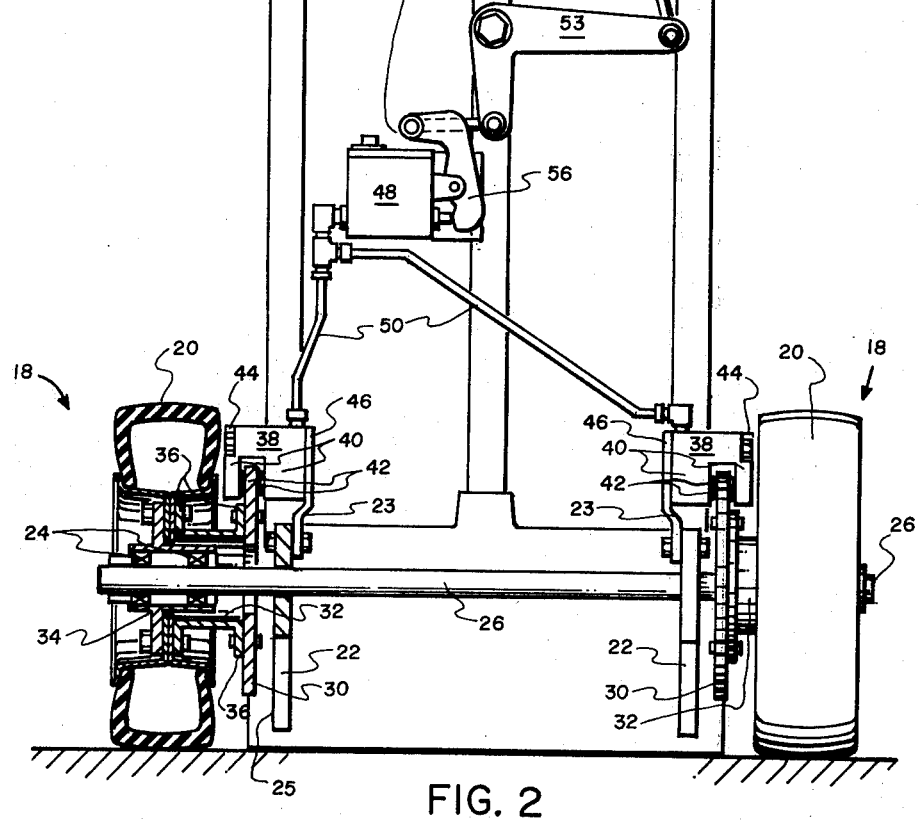
FIG. 2 is a rear view of the hand truck of FIG. 1 with the left wheel attached thereto and the rear skids removed, including a partially sectional view of the left wheel and braking mechanism.

Referring to FIGS. 1 and 2 a typical hand truck 10 is shown having a frame 12, a lifting blade 14 attached to the front of the frame for slipping underneath items to be moved, and a grip handle 16 attached near the top of the frame for manipulating the hand truck. A pair of wheels 18, having pneumatic tires 20 mounted thereon, are attached to the frame 12 by a pair of vertically-oriented frame side supports 22 protruding rearwardly at the bottom of the frame. The wheels rotate independently of one another, each being mounted by separate bearings 24 on a single fixed axle 26 which extends through the side supports 22. Ordinarily a pair of skids 28 is also attached to the frame for pulling the hand truck over obstacles.

A respective flat, rigid, annular disc 30 is fixed coaxially to each of the two wheels 18 between a respective side support member 22 and the wheel so as to rotate in unison with the wheel. Mounting the disc exterior to, rather than interior to, the side support member 22 avoids the use of separate rotating axles and their respective supports and bearings which would otherwise increase the weight of the hand truck significantly. In the preferred embodiment the discs 30 are mounted on the wheels by sleeves 32 which surround the axle 26 and a portion of the wheel hubs 34. Each sleeve has a pair of outwardly projecting flanges 36 for bolting to the respective wheel and disc; however, it should be recognized that other arrangements for fixing the discs to the wheels might be utilized without departing from the principles of the invention.

In conjunction with each disc a caliper 38, having a pair of substantially parallel finger-like members 40 forming a slot therebetween, is fixedly mounted to a respective side support member 22 of the frame 12 such that the caliper 38 is disposed adjacent the perimeter of the disc with the disc positioned to rotate through the slot formed between the finger members 40. Each finger member includes a friction pad 42 which, when the caliper is actuated, rubs against a side of the rotating disc thereby forcibly pinching the disc to produce the necessary braking friction. These pads are relatively small, inexpensive and easy to replace and thus represent a considerable advantage over other brakes.

It is particularly important that each caliper be attached to the hand truck in such a manner as to minimize the space required between the support 22 and the inside wall of the corresponding wheel 18 to minimize the spread of the hand truck wheels so that the hand truck can fit through relatively narrow entryways and operate along narrow aisles. This is accomplished by utilizing a narrow caliper with its largest, active finger member disposed on the inside surface of the disc and its passive member disposed on the outside surface between the wheel and disc, recessing the mounting hardware such as the bolts 44 into the caliper, and placing the active side of the caliper laterally inwardly of the outer surface 25 of the support so that the caliper is partially inwardly and partially outwardly of such outer surface. These measures insure that the wheel 18, disc 30 and support 22 are as close together as possible without touching so as to minimize the wheel spread. Each caliper 38 is attached to its support 22 by a plate 46 bolted to both the caliper and the support, and placement of a portion of the caliper inwardly of the support is aided by a bend 23 in the plate 46. Moreover it is advantageous that the mounting hardware place each caliper above and slightly forward of the axle 26 to minimize the distance between the caliper and the actuation mechanism, and to place the calipers directly over the axle when the hand truck is tilted backwards for moving so that the height of the calipers above the ground is maximized for their protection from physical obstacles.

In order to ensure that the brake friction pads 42 wear and apply pressure evenly, some free lateral movement of either the calipers or the discs must be provided. While the calipers could be mounted to move back and forth laterally with respect to the frame, such an arrangement would require undesirable hardware which would tend to increase the weight of the hand truck and, more importantly, require more space between the wheels and the support members 22 thereby spreading the wheels. This problem has been overcome by providing bearings 24 which permit lateral movement of the wheels 18 with respect to the axle 26 and frame 12 and thereby provide the required amount of lateral movement in the position of the discs relative to the frame.

A hydraulic actuation mechanism, comprising a master cylinder 48, a pair of hydraulic fluid lines 50 connecting the calipers 38 to the master cylinder 48 and a mechanical bellcrank linkage system 52, is provided for operating the calipers. The hydraulic system provides a significant mechanical advantage without unduly complex mechanical linkages which would otherwise add unnecessary and unwanted weight, wear and friction to the brake system. An operating handle 54 is placed directly underneath the hand truck handle 16 so that the brake may be actuated by a squeezing motion of the same hand which is used to manipulate the hand truck, leaving the operator's other hand to control the load or open doors or the like. When the operating handle 54 is squeezed upwardly the mechanical linkage 52, acting through a bellcrank 53 and a lever 56, applies a magnified force to the master cylinder 48, thereby generating a pressure in the fluid lines 50. The pressurized fluid acts upon an actuating area of the active finger member of each caliper, such actuating area being larger than the area of the master cylinder's piston so as to further magnify the force applied to the master cylinder by the linkage 52. The pressure actuates the calipers in a modulating fashion depending on the squeezing force exerted on the lever 54.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A brakeable hand truck comprising, in combination:
   a. a generally upright, load-supporting frame having a lifting blade projecting forwardly adjacent the bottom of said frame;
   b. a pair of laterally spaced wheels rotatable independently from one another mounted to the rear of said frame adjacent the bottom thereof on a single common axle attached to said frame, for movably supporting said hand truck;
   c. a disc coaxially fixed directly to each of said wheels so as to rotate in unison therewith;
   d. a pair of calipers fixedly attached to said frame respectively on each side thereof, each caliper having two spaced finger members disposed respectively on each side of a respective disc for forcibly pinching said disc therebetween;
   e. bearings mounting said wheels on said axle, said bearings permitting said wheels to move laterally on said axle with respect to said frame; and
   f. actuator means connected to said calipers for causing said finger members to pinch said respective disc.

2. The apparatus of claim 1 wherein said frame has a pair of laterally spaced side support members adjacent the bottom thereof for mounting said axle, said wheels being disposed laterally outwardly from said side support members and said discs being disposed between their corresponding wheels and said side support members.

3. The apparatus of claim 2 wherein each said caliper is positioned partially inwardly and partially outwardly of the outer surface of a respective side support member thereby reducing the space required between said wheels and said frame.

4. The apparatus of claim 2 wherein each said caliper is mounted on a respective one of said side support members.

5. The apparatus of claim 1 wherein said calipers are hydraulically operated, said actuator means including means for pressurizing hydraulic fluid in said calipers so as to cause said finger members to pinch said respective discs.

6. The apparatus of claim 5 wherein said actuator means comprises a master cylinder mounted on said frame and connected to said calipers by hydraulic fluid conduits, a hand-operated brake handle mounted on said frame at an upper portion of said frame, and mechanical linkage means for connecting said master cylinder with said brake handle.

7. A brakeable fulcrumed hand truck for manually moving freight comprising, in combination: a generally upright elongate frame; a rearwardly projecting grip handle attached to said frame near the top thereof for manually manipulating said hand truck; a forwardly projecting lifting blade attached to said frame adjacent the bottom thereof for supporting said material to be moved by said hand truck; a pair of laterally-spaced, rearwardly projecting side support members attached to said frame adjacent the bottom thereof; a single axle mounted on said side support members such that said axle is disposed across said frame transversely at the bottom and to the rear thereof and projects laterally outwardly from each said support member for supporting a pair of wheels; a pair of laterally spaced wheels rotatable independently from one another each mounted on said axle outwardly from a respective one of said side support members for movably supporting said hand truck, said frame being fulcrumed on said wheels about the axis of said axle; a pair of discs, each connected to one of said pair of wheels so as to rotate in unison therewith, said discs being oriented in a vertical plane perpendicular to said axle and located between their respective wheels and the closest of said side support members so as to provide a pair of braking surfaces located outwardly of each said side support member and oriented vertically so as to prevent the accumulation of moisture and dust on said braking surfaces; a pair of hydraulically-actuated calipers mounted respectively on each side of said frame, each said caliper having two spaced finger members disposed respectively on each side of a respective disc for forcibly pinching said disc therebetween by engaging said braking surfaces; a hydraulic master cylinder mounted on said frame for pressurizing said calipers; parallel hydraulic conduit means connecting said master cylinder to each of said calipers such that equal hydraulic pressure is transmitted from said master cylinder to each of said calipers for actuation thereof; and a hand-operated brake handle disposed adjacent said grip handle and connected by a mechanical linkage to said master cylinder for operating said master cylinder to produce hydraulic pressure therein and thereby actuate said calipers to forcibly engage said vertical braking surfaces, the combination of said calipers, master cylinder and mechanical linkage providing a mechanical advantage causing the force applied by said calipers to be greater than the force applied to said hand-operated brake handle.

* * * * *